Patented Oct. 7, 1952

2,613,190

UNITED STATES PATENT OFFICE 2,613,190

PREPARATION OF SHEET MATERIALS CONTAINING FIBERS, CORK PARTICLES, AND A RUBBERLIKE BINDER

David A. Feigley, Jr., Manheim Township, Lancaster County, Pa., assignor to Armstrong Cork Company, Lancaster, Pa., a corporation of Pennsylvania No Drawing. Application January 26, 1951, Serial No. 208,081

7 Claims. (Cl. 260—17.4)

This application is a continuation-in-part of my copending application Serial No. 168,645, filed June 16, 1950.

This invention relates to the preparation of rubber bonded cork and fiber materials. More particularly, the invention relates to a process of preparing such products in which the cork particles are picked up by the binder and are evenly deposited upon the fibers while in suspension such as in a conventional paper-making beater and thereafter forming the resulting slurry into a sheet.

Cork and fibrous sheets have been prepared in a number of ways, many of which are basically comprised of the steps of passing the sheet of cork and fiber particles through a binder. There have been some instances wherein cork particles and organic fibers such as kraft fibers have been subjected to the action of a beater, and while in the beater the beaten mixture has been treated to coagulate a rubberlike binder on the fibers. However, generally speaking, extreme difficulties have been experienced in the beater saturation method of producing a cork and organic fiber sheet material bonded with rubber. The chief difficulty in beater saturation by this technique appears to be due to the tendency of the cork particles to float out during the formation of a wet slurry into a sheet. This results in a product having a rather high concentration of cork particles at the top surface of the resulting sheet. Obviously this is undesirable as it results in the production of a very nonuniform sheet material.

Since one of the more important uses of a fibrous material containing cork particles is in the manufacture of low cost gasket material, it is highly desirable that the sheet from which the gasket is cut be substantially uniform throughout.

I have found that cork particles may be uniformly distributed throughout a fibrous sheet material in a beater saturation process provided the cork particles are of very fine particle size. In accordance with my invention a mass of cork particles, the preponderant portion of which will pass through a Tyler standard 200 mesh screen, is employed. In other words, these particles may be characterized as 200 to dust cork. When the particle size exceeds 200 mesh, it is not possible to obtain uniform distribution for a number of reasons including the tendency of the cork particles to float to the top of the slurry, resulting in the laying of a nonuniform sheet.

In accordance with my invention the rubberlike binder may be any of a number of synthetic rubbers. Typical of these materials are the products known as "GR-S," which is a copolymer of butadiene and styrene containing about 50% to 70% butadiene; "Hycar," which is a copolymer of butadiene and acrylonitrile containing about 60% to 80% butadiene; and neoprene, which is a polymer of 2-chloro butadiene-1,3. If desired, homopolymers of butadiene may be employed in the production of beater saturated materials as well as homopolymers and/or copolymers of butadiene homologues such as isoprene. These materials can be generically designated as synthetic rubbers, and more specifically designated as rubberlike polymers of butadiene, isoprene, and chloroprene, and rubberlike copolymers of butadiene or isoprene with copolymerizable vinyl compounds such as styrene and acrylonitrile. The first step in the preferred embodiment of my invention involves forming a slurry containing the fibrous material which may be any organic or inorganic fiber such as kraft fibers, cotton linters, asbestos, and the like. Fibers of natural origin are preferred, but I may also employ synthetic fibers, such as nylon glass fibers and the like, in the practice of my invention. The resulting suspension or slurry is then treated with a solution of polyvalent metal ions, preferably by adding to the slurry a solution of aluminum chloride. Generally speaking, it is preferred to utilize a salt of a polyvalent metal such as aluminum chloride, ferric chloride, stannic chloride, and the like, added by means of dilute solutions such as up to 10% by weight.

After treatment of the fibers with the polyvalent metal ions such as $Al^{+++}$ in the form of aluminum chloride solution, the polyvalent metal ions are inactivated by converting them to an insoluble state or to a compound of very limited water solubility by the addition of a suitable hydroxide such as ammonium hydroxide. The addition of the ammonium hydroxide converts the aluminum chloride, for example, to aluminum hydroxide. This is an important step in the preferred embodiment of my invention inasmuch as the inactivated ions do not prematurely coagulate the synthetic rubber which is to be added in the form of a latex. Following inactivation, as indicated above, the synthetic rubber latex containing any of the synthetic rubbers mentioned hereinabove is then added to the slurry. Thereafter, the solids content of the latex is coagulated or precipitated. This may be accomplished by the addition of an acid. The slow addition of acid, for example acetic acid, releases $Al^{+++}$ ions by reacting with the aluminum hydroxide and at the same time coagulates the rubber which carries the cork onto the fibrous material suspended in the slurry. This reaction occurs until all of the rubber is exhausted onto the fibers giving a uniformly distributed and uniformly bonded mass of suspended material. After completion of the coagulation the resulting slurry is then transferred by any conventional means to conventional papermaking equipment such as a wire, and a sheet containing the rubberlike binder and uniformly distributed fibers and cork particles is formed. The following examples are typical of the process of my invention:

*Example I*

35¼ lbs. of hardwood sulfite pulp and 31½ lbs. of finely divided cork, the preponderant portion of which passed through a 200 mesh screen, were dispersed in 900 gallons of water. 15 lbs. of alum were then added to the batch and stirred in thoroughly. Sufficient 28% ammonia solution was then added to the slurry to bring the pH to about 8. Normally this requires about 4500 cc. 1360 cc. of a 10% solution of "Tamol N" (the sodium salt of polymerized alkyl aryl sulfonic acid) were then mixed with 75 lbs. of a butadiene-acrylonitrile synthetic rubber latex (40% solids). The resulting mixture was then added to the slurry with vigorous agitation. As a result of agitation, the solids content of the latex is coagulated upon the fiber and cork particles.

*Example II*

37 lbs. of hardwood sulfite pulp and 31 lbs. of finely divided cork particles, the preponderant portion of which passed through a 200 mesh screen, were agitated in water to form a slurry. 174 grams of Erie brown dye, 273 grams of 50% dispersion of Agerite white antioxidant were added to the slurry. Thereafter, sufficient ammonia, normally 3750 cc. of a 28% solution, is added to bring the pH of the mixture to about 8.0. 680 cc. of a 10% solution of "Tamol N" are added to 79 lbs. of a 38% solids GR–S No. 3 latex, with vigorous agitation. The resulting mixture of latex and Tamol solution is then added to the slurry with agitation. Thereafter, about 2 lbs. of acetic acid are added to accelerate the coagulation of the solids content of the latex onto the fibers and cork particles.

Sheets produced in accordance with my invention may be used in a number of ways. For example, cork and fibrous sheet, beater saturated with rubberlike binder, may be employed as an undercovering for rugs to prevent slippage on highly polished floors. They may be used to form gaskets which are very suitable as sealing materials because of the compressible nature of the sheet due to the cork particles therein. The sheets may be used in the manufacture of window panel material, particularly for use in the assembly of automobiles, and another use along this line involves the production of antisqueak materials for use in the assembly of automobiles. Probably the outstanding use of the material is as a low-cost gasket material. The material, due to the presence of cork particles and fibers, possesses unusual resiliency; and because of the manner in which the binder is included in the sheet, the product possesses unusual tear resistance.

I claim:

1. A method of making sheet material containing fibers, cork particles, and a rubberlike binder, which comprises forming an aqueous slurry containing papermaking fibers and 200 mesh to dust cork particles; adding to said slurry a water-soluble salt of the group consisting of aluminum salts, ferric salts, and stannic salts; converting said salt to a water-insoluble hydroxide by reacting the same with a hydroxide; adding to the resulting slurry a latex of a synthetic rubber of the group consisting of rubberlike polymers of butadiene, rubberlike polymers of isoprene, rubberlike polymers of chloroprene, rubberlike copolymers of butadiene with copolymerizable vinyl compounds, and rubberlike copolymers of isoprene with copolymerizable vinyl compounds; agitating the resulting material to coagulate the solids of said latex until substantially all of the solids content thereof has carried said cork particles onto said fibers; and forming the resulting suspension into a sheet.

2. The product of the process of claim 1.

3. A method of making sheet material containing organic papermaking fibers, cork particles, and a rubberlike binder, which comprises forming an aqueous slurry containing organic papermaking fibers and 200 mesh to dust cork particles; adding to the slurry a soluble salt of the group consisting of aluminum salts, ferric salts, and stannic salts; adding to the resulting slurry an alkaline hydroxide, thereby converting said salt to a water-insoluble hydroxide; adding a butadiene-styrene copolymer latex to said slurry; agitating the resulting slurry until substantially all of the solids content of said latex has carried said cork particles onto said fibers; and forming the resulting suspension into a sheet.

4. A method of making sheet material containing organic papermaking fibers, cork particles, and a rubberlike binder, which comprises forming an aqueous slurry containing organic papermaking fibers and 200 mesh to dust cork particles; adding to the slurry a soluble salt of the group consisting of aluminum salts, ferric salts, and stannic salts; adding to the resulting slurry an alkaline hydroxide, thereby converting said salt to a water-insoluble hydroxide; adding a chloroprene polymer latex to said slurry; agitating the resulting slurry until substantially all of the solids content of said latex has carried said cork particles onto said fibers; and forming the resulting suspension into a sheet.

5. A method of making a sheet material containing organic papermaking fibers, cork particles, and a rubberlike binder, which comprises forming an aqueous slurry containing organic papermaking fibers and 200 mesh to dust cork particles; adding to the slurry a soluble salt of the group consisting of aluminum salts, ferric salts, and stannic salts; adding to the resulting slurry an alkaline hydroxide, thereby converting said salt to a water-insoluble hydroxide; adding a butadiene-acrylonitrile copolymer latex to said slurry; agitating the resulting slurry until substantially all of the solids content of said latex has carried said cork particles onto said fibers; and forming the resulting suspension into a sheet.

6. A method of making sheet material containing organic papermaking fibers, cork particles, and a rubberlike binder, which comprises forming a slurry containing organic papermaking fibers and 200 mesh to dust cork particles; adding a dilute solution of a water-soluble aluminum salt to said slurry; adding a hydroxide to said slurry to convert said aluminum salt to aluminum hydroxide; adding a synthetic rubber latex containing a synthetic rubber of the group consisting of rubberlike polymers of butadiene, rubberlike polymers of isoprene, rubberlike polymers of chloroprene, rubberlike copolymers of butadiene with copolymerizable vinyl compounds, and rubberlike copolymers of isoprene with copolymerizable vinyl compounds; agitating the resulting slurry until substantially all of the solids content of said latex has carried said cork particles onto said fibers; and forming the resulting suspension into a sheet.

7. A method of making sheet material containing organic papermaking fibers, cork particles, and a rubberlike binder, which comprises forming a slurry containing organic papermaking fibers and 200 mesh to dust cork particles; adding a dilute solution of an aluminum salt to said slurry; converting said added aluminum salt to aluminum hydroxide by the addition to said slurry of ammonium hydroxide; adding a latex of a synthetic rubber of the group consisting of rubberlike polymers of butadiene, rubberlike polymers of isoprene, rubberlike polymers of chloroprene, rubberlike copolymers of butadiene with copolymerizable vinyl compounds, and rubberlike copolymers of isoprene with copolymerizable vinyl compounds; agitating said slurry while adding a coagulating acid thereto, thereby causing the solids content of said latex to carry said cord particles onto said fibers; and forming the resulting suspension into a sheet.

DAVID A. FEIGLEY, Jr.

No references cited.